United States Patent Office 3,280,044
Patented Oct. 18, 1966

3,280,044
METAL SALTS OF EPICHLOROHYDRIN-PIPERA-ZINE-AMINE POLYCONDENSATES
Alberto Bonvicini and Ennio Ildos, Terni, Italy, assignors to Montecatini Società Generale per l'Industria Mineraria e Chimica
No Drawing. Filed Jan. 30, 1963, Ser. No. 255,086
Claims priority, application Italy, Feb. 2, 1962, 2,113/62
6 Claims. (Cl. 260—2)

The present invention relates to certain inorganic derivatives of basic nitrogen polycondensates and to a process for preparing them.

Various basic nitrogen polycondensates, which are obtained by reacting epichlorohydrin with one or more amines or with diglycidyl derivatives, in the presence or absence of condensing agents and alkylating agents, have been described in applicants' U.S. patent applications Serial No. 30,732, filed May 23, 1960, and now abandoned; Serial No. 124,346, filed July 17, 1961, and Serial No. 212,119, filed July 24, 1962.

More particularly, the following polycondensates have been described: aliphatic amine-epichlorohydrin-diamine; aliphatic amine-epichlorohydrin-imine; diamine-epichlorohydrin-alkylhalide; aliphatic amine-epichlorohydrin-bis-secondary diamine; and epichlorohydrin-halogen derivatives-bis-secondary diamine.

It is therefore an object of the present invention to now produce insoluble inorganic derivatives of these polycondensates and to provide a method for obtaining these inorganic derivatives from the polycondensates.

We have found that by reacting such basic nitrogen polycondensates of epichlorohydrin, preferably in solution, with salts of metals from groups I, II, III, IV, VII or VIII of the Mendeleeff Periodic Table preferably in solution, insoluble precipitates are obtained.

Of particular interest are the polycondensates obtained by the reaction of epichlorohydrin with piperazine and n-octadecylamine and those obtained by reaction of epichlorohydrin with piperazine and n-dodecylamine.

The salts which can be used according to the present invention are, as mentioned above, salts of the metals from groups I, II, III, IV, VII or VIII of the Mendeleeff Periodic Table, such as, for example, halides, nitrates, nitrate, sulphates, phosphates, acetates and the like.

More particularly there may be mentioned copper sulphate, aluminum sulphate·18$H_2O$, ferrous sulphate, cerium$^{(+++)}$ sulphate, stannous chloride, manganous chloride, mercuric chloride, titanium trichloride, zinc chloride, ferric chloride, cobalt nitrate, lead nitrate, thorium nitrate, cadmium acetate, $NiSO_4$, $MgSO_4$, $CaCl_2$, $Bi(NO_3)_2$ and $BeCl_2$.

According to the present invention, solutions of the basic nitrogen polycondensates of epichlorohydrin and solutions of the aforementioned salts are mixed while maintaining agitation at temperatures between room temperature and the boiling point of the solvent used, preferably from 20° to 120° C., for times varying from 5 seconds to 24 hours.

The inorganic salt is preferably employed in an amount of from 0.01 to 1 mole per nitrogen atom of the polycondensate.

The inorganic complexes precipitate from these solutions and are separated by means of filtration or centrifugation.

Various solvents may be used such as, for example, water, alcohols, ethers, aliphatic hydrocarbons, aromatic hydrocarbons, and the like.

The inorganic derivatives of nitrogen polycondensates obtained according to the present invention find various uses, e.g. in the treatment of textile materials, as tinctorial modifiers for textile materials, etc.

The following examples are given to illustrate the present invention wihout limiting its scope.

Example 1

10 g. of a polycondensate, obtained by reaction of octadecylamine, epichlorohydrin and piperazine, having a nitrogen content of 13.04% and an OH-group content of 9.12% are dissolved in 100 cc. of isopropanol. This is added, while agitating at 20° C., to 0.5 g. of $ZnCl_2$, dissolved in 20 cc. of methanol.

A white precipitate is obtained which is filtered, washed with methanol and then dried at 25–30° C. under a vacuum of 20 mm. The analysis of the product shows that it has the following characteristics:

|  | Percent |
|---|---|
| N content | 12.35 |
| Zn content | 2.4 |

Example 2

50 g. of a polycondensate obtained by reaction of octadecylamine, epichlorohydrin and piperazine, having a nitrogen content of 13.04% and an OH group content of 9.12% are dissolved in 700 cc. of isopropanol. This is then added, while agitating at 25° C., to 25 g. of $ZnCl_2$ dissolved in 200 cc. of methanol.

A white precipitate is thus obtained which is filtered, washed with methanol and then dried at 25–30° C. under a residual vacuum of 20 mm. Analysis shows that the product has the following characteristics:

|  | Percent |
|---|---|
| N content | 9.8 |
| Zn content | 15.4 |
| Cl content | 15.3 |

Example 3

10 g. of a polycondensate obtained by reaction of octadecylamine, epichlorohydrin and piperazine, having a nitrogen content of 13.04% and an OH group content of 9.12%, are dissolved in 100 cc. of isopropanol. This is then added, while agitating at 25° C., to 3 g. of $TiCl_3$ dissolved in 30 cc. of water.

A brown precipitate is obtained which is filtered, washed with methanol and dried under reduced pressure. Analysis shows that the product has the following characteristics:

|  | Percent |
|---|---|
| N content | 10.22 |
| Ti content | 8.6 |

Example 4

100 g. of a polycondensate obtained by reaction of octadecylamine, epichlorohydrin and piperazine, having a nitrogen content of 13.04% and an OH-group content of 9.12%, are dissolved in 1000 cc. of methanol. This is added, while agitating at 25° C., to 95 g. of lead$^{(++)}$ nitrate dissolved in 400 cc. of water.

A white precipitate is obtained which is filtered, washed with water and dried under vacuum. Analysis shows that the product has the following characteristics:

|  | Percent |
|---|---|
| N content | 7.5 |
| Pb content | 28.5 |

Example 5

100 g. of polycondensate obtained by reaction of n-octadecylamine, epichlorohydrin and piperazine, having a nitrogen content of 13.04% and an OH-group content of 9.12%, are dissolved in 1000 cc. of methanol. The resulting solution is added, while agitating at 25° C., to 32 g. of ferric chloride in 200 cc. of water.

An orange-yellow precipitate is obtained which is filtered, washed with methanol and dried under reduced pressure. Analysis shows that the product has the following characteristics:

| | Percent |
|---|---|
| N content | 10.2 |
| Fe content | 9.1 |

*Example 6*

100 g. of a polycondensate obtained by reaction of n-dodecylamine, epichlorohydrin and piperazine, having a nitrogen content of 15% and an OH-group content of 10.3%, are dissolved in 1500 cc. of methanol. This is then added, while agitating at 50° C., to 90 g. of thorium nitrate tetrahydrate, dissolved in 300 cc. of water.

A yellow precipitate is obtained which is filtered, washed with water and methanol and dried under reduced pressure. Analysis of the product gives the following results:

| | Percent |
|---|---|
| N content | 8.55 |
| Th content | 19.7 |

*Example 7*

100 g. of a polycondensate obtained by reaction of diglycidylpiperazine with octadecylamine and piperazine, having a nitrogen content of 13.1% and an OH-group content of 9.25%, are dissolved in 1000 cc. of methanol. This is added, while agitating at 25° C., to 50 g. of cerium$^{(+++)}$ sulphate octahydrate dissolved in 300 cc. of water.

A yellow precipitate is obtained which is filtered, washed with water and dried under reduced pressure. Analysis of the product gives the following results:

| | Percent |
|---|---|
| N content | 10 |
| Ce content | 19.3 |

*Example 8*

50 g. of a polycondensate obtained by reaction of n-octadecylamine, epichlorohydrin and piperazine, having a nitrogen content of 13.10%, are dissolved in 500 ml. of isopropanol. The resulting solution is then added, while agitating at 25° C., to 20 g. of aluminum isopropylate in 200 ml. of isopropanol. A white precipitate is obtained which is filtered, washed with isopropanol and dried under reduced pressure at 80° C. Analysis shows that the product has the following characteristics:

| | Percent |
|---|---|
| N content | 12 |
| Al content | 5 |

Many variations and modifications can, of course, be made without departing from the spirit and scope of the present invention.

Having described the invention, what it is desired to secure and claim by Letters Patent is:

1. Inorganic derivatives of nitrogen polycondensates, which polycondensates are obtained by reacting epichlorohydrin and piperazine with an amine selected from the group consisting of octadecylamine and dodecylamine, said derivatives being the reaction products of said polycondensates with a metal salt selected from the group consisting of the halides, nitrates, sulphates and acetates of copper, aluminum, iron, cerium, tin, manganese, mercury, titanium, zinc, cobalt, lead, thorium, cadmium, nickel, magnesium, calcium, bismuth and beryllium, at a temperature of from 20°–120° C., in a ratio of from 0.01 to 1.0 mole of metal salt per nitrogen atom of said polycondensate.

2. A process for preparing inorganic derivatives of basic nitrogen polycondensates, which polycondensates are obtained by reacting epichlorohydrin and piperazine with an amine selected from the group consisting of octadecylamine and dodecylamine, which process comprises reacting, in an organic reaction medium, said polycondensates with a metal salt selected from the group consisting of the halides, nitrates, sulphates and acetates of copper, aluminum, iron, cerium, tin, manganese, mercury, titanium, zinc, cobalt, lead, thorium, cadmium, nickel, magnesium, calcium, bismuth and beryllium at a temperature of from 20°–120° C., in a ratio of from 0.01 to 1.0 mole of metal salt per nitrogen atom of said polycondensate, and recovering the precipitated insoluble inorganic metal salt derivative.

3. The process of claim 2, wherein a polycondensate of epichlorohydrin with n-octadecylamine and piperazine is used.

4. The process of claim 2, wherein a polycondensate of epichlorohydrin with piperazine and n-dodecylamine is used.

5. The process of claim 2, wherein said reaction is carried out in at least one solvent selected from the group consisting of water, methanol and isopropanol.

6. The process of claim 5, wherein the reaction is carried out at a temperature between room temperature and the boiling point of the solvent.

References Cited by the Examiner

UNITED STATES PATENTS

| 2,143,388 | 1/1939 | Schlack | 260—2 |
| 2,898,309 | 8/1959 | Greer | 260—2.1 |
| 3,129,176 | 4/1964 | Ihde | 252—8.8 |

FOREIGN PATENTS

| 443,632 | 2/1936 | Great Britain. |

OTHER REFERENCES

Weissberger: Technique of Organic Chemistry, vol. III, part I, Separation and Purification, 2nd ed., 1956, Interscience, New York, pages 474–475 relied on.

WILLIAM H. SHORT, *Primary Examiner.*

TIMOTHY D. KERWIN, *Examiner.*

S. N. RICE, T. P. PERTILLA, J. C. MARTIN,
*Assistant Examiners.*